(12) United States Patent
Chesney

(10) Patent No.: US 7,985,062 B2
(45) Date of Patent: Jul. 26, 2011

(54) APPARATUS AND PROCESS FOR TWO-SIDED THERMOFORMING

(76) Inventor: Benjamin Chesney, Milwaukee, WI (US)

( * ) Notice: Subject to any disclaimer, the term of this patent is extended or adjusted under 35 U.S.C. 154(b) by 17 days.

(21) Appl. No.: 12/169,747

(22) Filed: Jul. 9, 2008

(65) Prior Publication Data
US 2009/0014923 A1    Jan. 15, 2009

Related U.S. Application Data

(60) Provisional application No. 60/958,684, filed on Jul. 9, 2007.

(51) Int. Cl.
*B28B 11/10* (2006.01)
*B29C 51/20* (2006.01)
*B29C 51/36* (2006.01)

(52) U.S. Cl. .................. 425/342.1; 425/358; 425/387.1; 425/388; 425/395

(58) Field of Classification Search .................. 425/388, 425/330, 342.1, 355, 387.1, 395, 358, 384; 264/505, 550, 551, 554
See application file for complete search history.

(56) References Cited

U.S. PATENT DOCUMENTS

| | | | | |
|---|---|---|---|---|
| 2,484,656 A * | 10/1949 | Sikka et al. | 425/356 |
| 2,736,065 A * | 2/1956 | Wilcox | 156/160 |
| 2,985,914 A * | 5/1961 | Miller | 425/388 |
| 3,218,379 A * | 11/1965 | Edwards | 264/549 |
| 3,242,245 A * | 3/1966 | Cunningham et al. | 264/545 |
| 3,338,997 A * | 8/1967 | Tigner | 264/549 |
| 3,450,807 A * | 6/1969 | Cheney | 264/549 |
| RE28,364 E * | 3/1975 | Corazza | 264/51 |
| 4,239,727 A * | 12/1980 | Myers et al. | 264/550 |
| 4,368,024 A * | 1/1983 | Asano | 425/397 |
| 4,397,804 A * | 8/1983 | Medwed | 264/292 |
| 4,668,175 A * | 5/1987 | Martin | 425/388 |
| 4,778,439 A * | 10/1988 | Alexander | 264/550 |
| 4,873,048 A * | 10/1989 | Jarvenkyla | 264/504 |
| 4,878,826 A * | 11/1989 | Wendt | 425/384 |
| 5,198,175 A * | 3/1993 | Kato et al. | 264/512 |
| 5,314,324 A * | 5/1994 | Wendt | 425/299 |
| 5,427,732 A * | 6/1995 | Shuert | 264/545 |
| 5,641,524 A * | 6/1997 | Rush et al. | 425/384 |
| 5,683,648 A * | 11/1997 | Fortin | 264/550 |
| 5,773,540 A * | 6/1998 | Irwin et al. | 425/387.1 |
| 6,257,866 B1 * | 7/2001 | Fritz et al. | 425/387.1 |
| 7,140,863 B2 * | 11/2006 | Koppenhofer | 425/292 |
| 7,582,249 B2 * | 9/2009 | Iwasaki et al. | 264/549 |
| 2004/0113329 A1 * | 6/2004 | Martin | 264/547 |
| 2004/0140593 A1 * | 7/2004 | Oda et al. | 264/550 |
| 2004/0256397 A1 * | 12/2004 | Nakazato et al. | 220/628 |
| 2006/0151924 A1 * | 7/2006 | Iwasaki et al. | 264/544 |

FOREIGN PATENT DOCUMENTS

JP     53051264 A  *  5/1978

* cited by examiner

*Primary Examiner* — Joseph S Del Sole
*Assistant Examiner* — Ryan Ochylski
(74) *Attorney, Agent, or Firm* — Boyle Fredrickson S.C.

(57) ABSTRACT

The present invention is a thermoforming device that includes a separate forming mold that can be positioned within a pair of primary mold sections to define a separate mold cavity therein. The separate mold cavity can be used to form details on various sections of a formed part that are not present on the remainder of the formed part due to the separation of the sections of the formed part from the remainder of the part due to the sealed engagement of the separate forming mold with the primary mold sections.

14 Claims, 4 Drawing Sheets

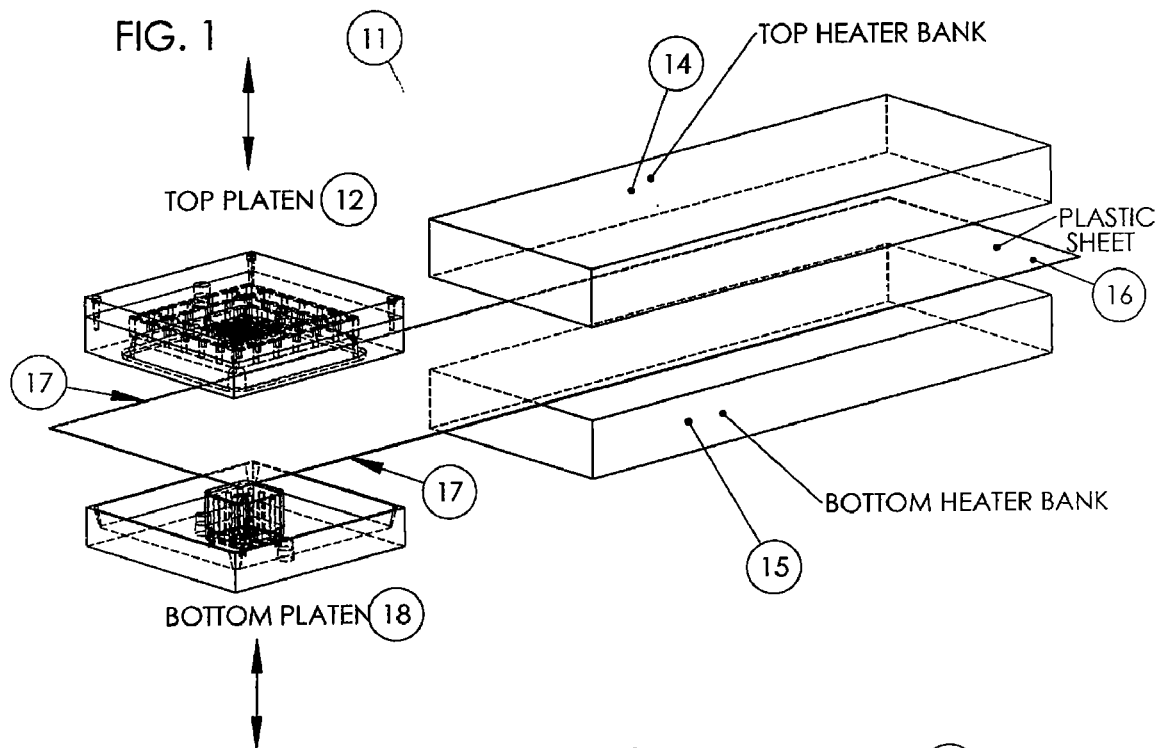
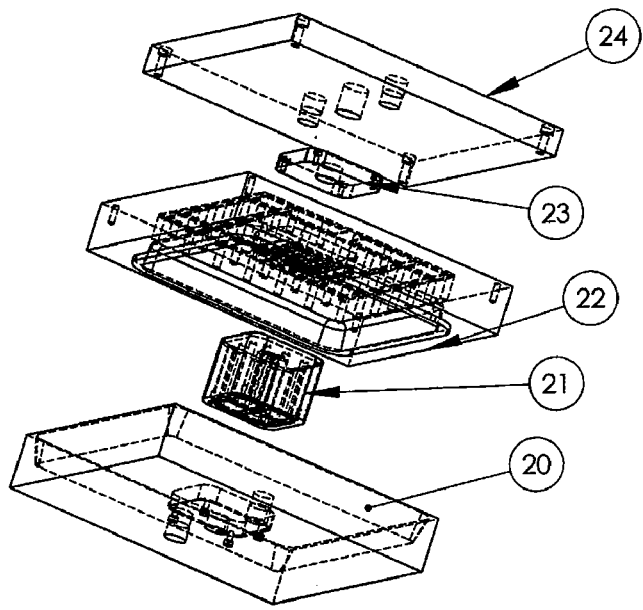

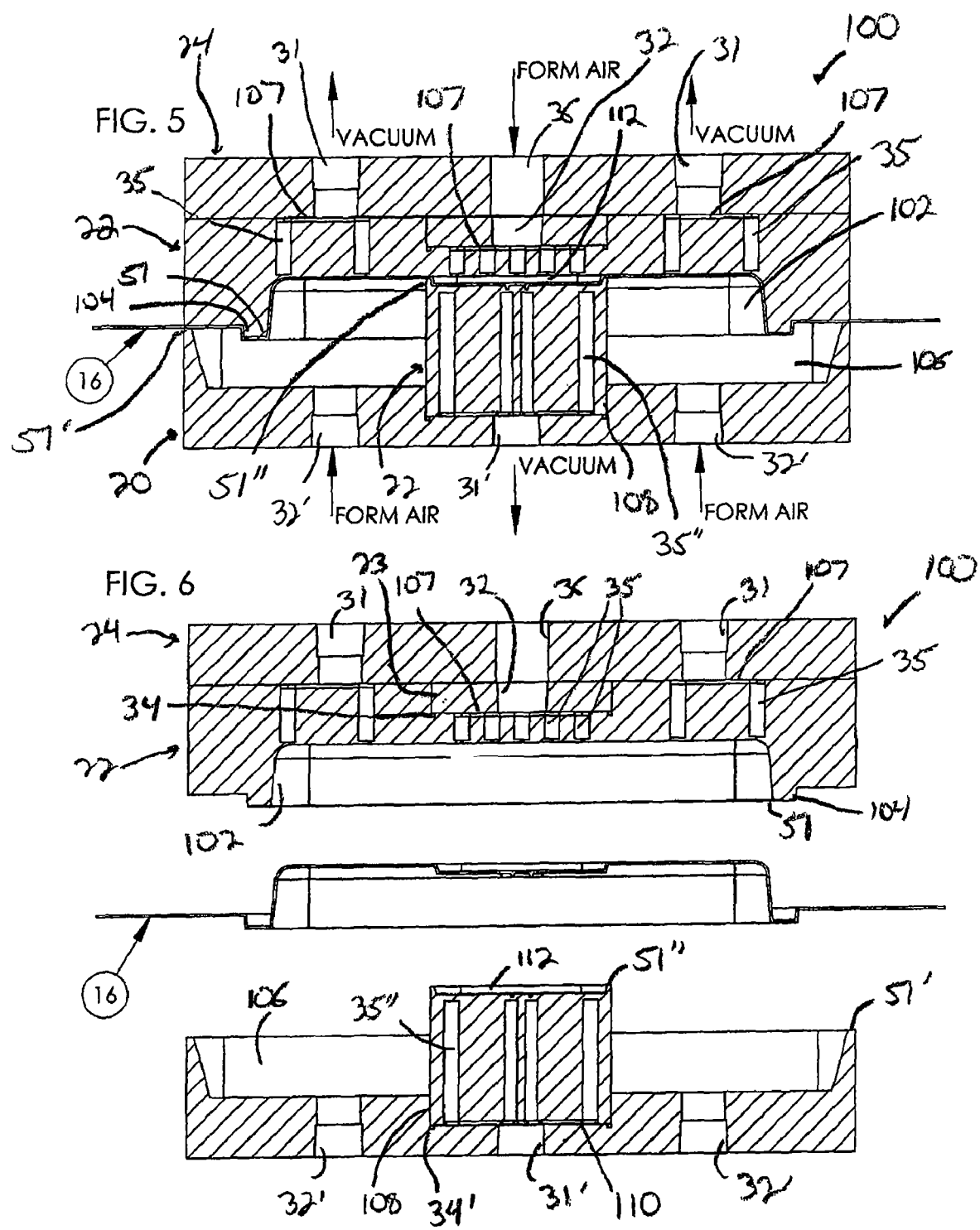

APPARATUS AND PROCESS FOR TWO-SIDED THERMOFORMING

CROSS-REFERENCE TO RELATED APPLICATION

This application claims priority from U.S. Provisional Application Ser. No. 60/958,684, filed on Jul. 9, 2007, which is expressly incorporated herein by reference in its entirety.

FIELD OF THE INVENTION

The present invention relates to devices for creating thermoformed materials and the processes for forming them, and more specifically to a process for forming a thermoformed item with features on both sides of the item.

BACKGROUND OF THE INVENTION

Previously, to create thermoformed items formed from plastic or other suitable materials having details disposed on opposite sides of the item, these items needed to be created using different and multiple molding processes. More specifically, the sheet of material or fluid material from which the item is to be formed is initially positioned within or directed into an injection or compression molding device in order to create the detail or feature required on one side of the item. Subsequently, the material sheet is positioned or run through a suitable thermoforming device to complete the formation of the item from the material.

However, this process has a number of significant drawbacks. First, when the sheet is positioned within the thermoforming device to finalize the form for the item, often times the thermoforming process results in the partial or complete deformation or destruction of the detail on the sheet. Thus the resulting item is often not usable for its intended purpose due to the damage done to the detail.

Additionally, to initially form the detail in the sheet or fluid material, the process requires that the sheet or fluid material be processed utilizing the injection or compression molding process, which is a process and device necessarily separate from the thermoforming device and process. Therefore, this prior art method for forming the item requires both a detail molding device and step, which can be either an injection molding step or a compression molding step, as well as the final thermoforming step used to create the final form for the item. The multiple steps and molding devices required for each step significantly increases the complexity and the costs for producing the item.

Therefore, it is desirable to develop a device and method for thermoforming an item which is capable of forming details on opposed sides of the item in a single step utilizing only the thermoforming device.

SUMMARY OF THE INVENTION

According to one aspect of the present invention, a device in the form of tooling for a thermoforming machine is provided that effectively holds a sheet of material to be thermoformed, such as a plastic or fabric sheet, in a manner allowing the material to be thermoformed to have details provided on each side of the material formed into the item. The tooling includes platens that engage and secure the edges of the material sheet, and an air box that is positioned on one of the platens. The air box defines a separate forming section between the platens that is connected to a separate forming vacuum or air flow supply. Thus, the section of the material sheet disposed within the section defined by the air box can be formed separately from the remaining portion of the material sheet, allowing details to be simultaneously formed on opposed sides of the material sheet.

According to another aspect of the present invention, the tooling used to thermoform both sides of the material sheet can be retrofit onto existing thermoforming machines, such that the tooling can be utilized effectively with existing thermoforming machines.

Other aspects, features and advantages of the present invention will be made apparent from the following detailed description.

BRIEF DESCRIPTION OF THE DRAWING FIGURES

The drawing figures illustrate the best mode currently contemplated of practicing the present invention.

In the drawings:

FIG. 1 is an isometric view of a thermoforming machine including thermoforming tooling constructed according to the present invention;

FIG. 2 is an exploded, isometric view of the thermoforming tooling of FIG. 1;

FIG. 5 is a cross-sectional view of the tooling of FIG. 2 in a closed position around the material sheet to thermoform the sheet;

FIG. 6 is a cross-sectional view of the tooling of FIG. 2 in the open position with a thermoformed sheet positioned between the tooling elements;

DETAILED DESCRIPTION OF THE INVENTION

Figure 3:
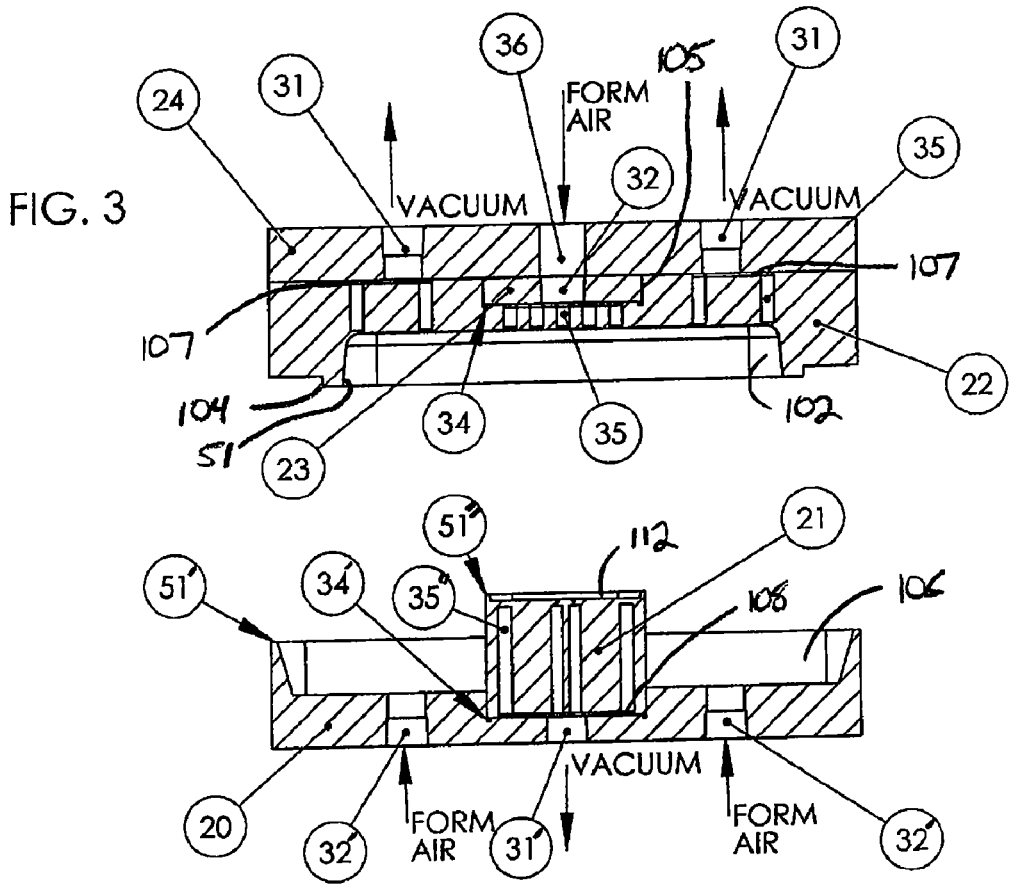
FIG. 3 is a cross-sectional view of the tooling of FIG. 2 in an open position.
Figure 4:
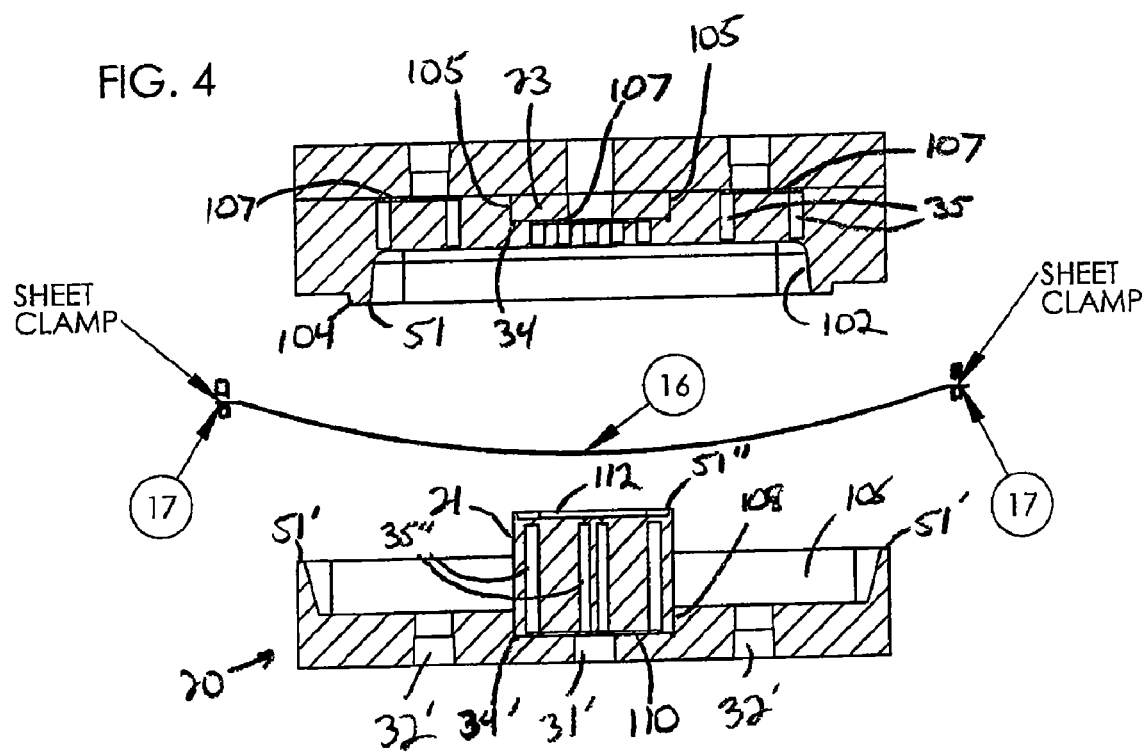
FIG. 4 is a cross-sectional view of the tooling of FIG. 2 with a sheet of material to be thermoformed positioned between the tooling elements.
Figure 7:
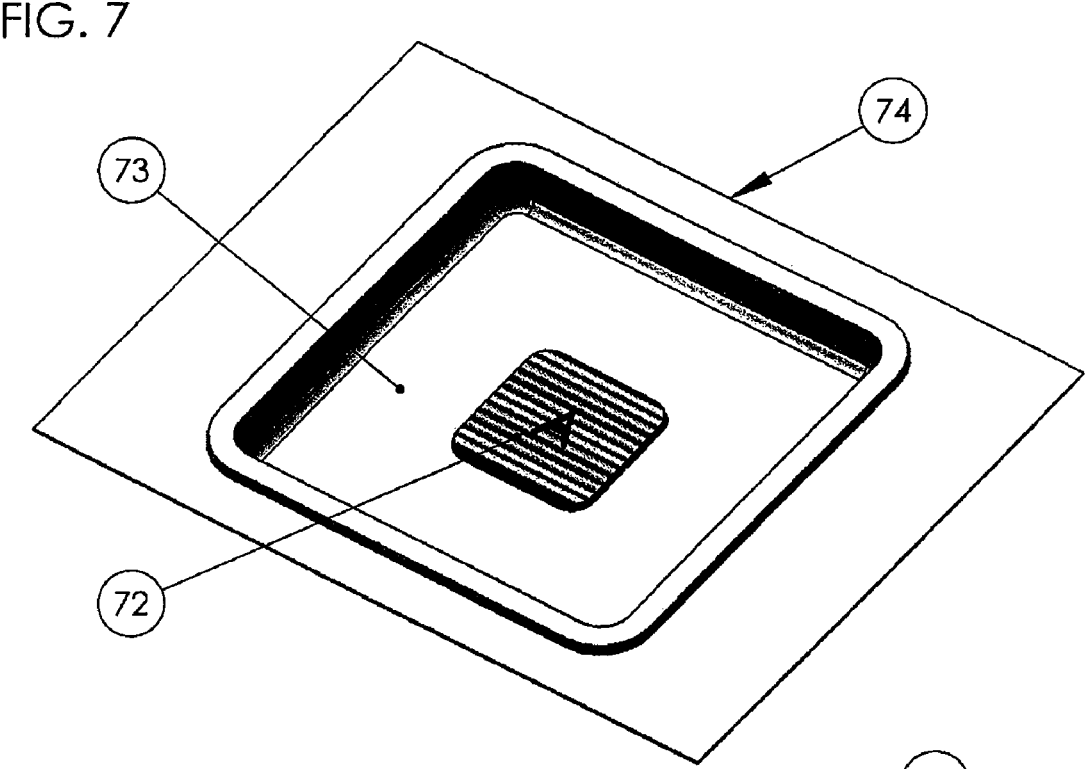
FIG. 7 is a top isometric view of the thermoformed sheet of FIG. 6.
Figure 8:
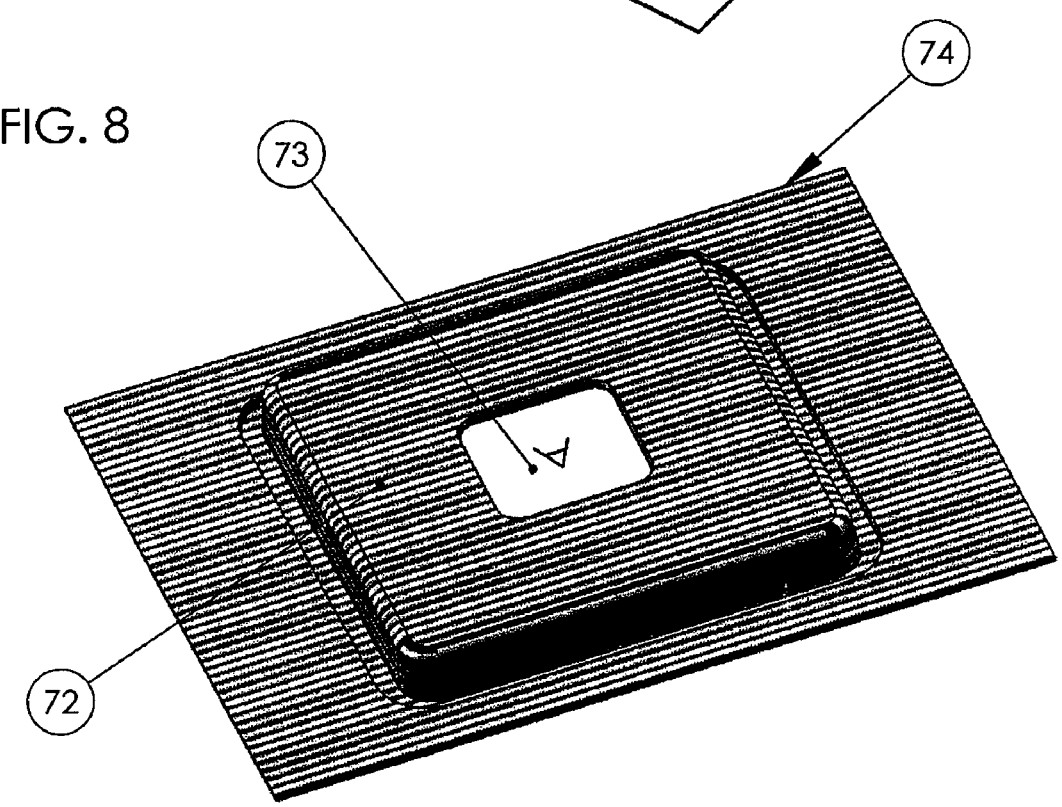
FIG. 8 is a bottom isometric view of the thermoformed sheet of FIG. 6.

With reference now to the drawing figures in which like reference numerals designate like parts throughout the disclosure, at thermoforming machine used to form an item of a thermoformable material is illustrated at 11 in FIG. 1. The machine 11 includes a pair of parallel heater banks 14 and 15. A sheet 16 of the thermoformable material is passed between the banks 14 and 15 in any suitable manner to heat the material sheet 16 into a formable state prior to reaching a forming device 100. The sheet 16 can either be a continuous sheet fed from a roll of the sheet material, or can be an individual sheet of the material that is fed sequentially into the machine 11, such as from a stack of the sheets.

Referring now to FIGS. 1-3, the forming device 100 includes a top platen 12 and a bottom platen 18 between which the heated material sheet 16 passes. As the sheet 16 is moved between the heater banks 14 and 15 and into position between the top platen 12 and the bottom platen 18, the sides of the sheet 16 are held and/or engaged by clamps 17 to hold the sheet 16 in position during the thermoforming process in a manner known to one of ordinary skill in the art.

The top platen 12 includes a mold plate 24 affixed to the top platen 12. The mold plate 24 is formed of a suitable material, and has a pair of airflow openings 31 and a clearance opening 36 formed therein. These openings 31 and 36 enable flows of air to be directed into or out of the top platen 12 to direct the formation of an item from the sheet 16. To assist in directing the airflow through the clearance opening 36, a back plate 23 is positioned over the opening 36. The back plate 23 includes an air hookup aperture 32 therein through which the air from opening 36 can pass. Also, the back plate 23 functions as mounting location for securing a mold 22 to the mold plate 24.

The mold 22 can have any desired shape, because the shape of the mold 22 defines the form of at least a portion of the item formed from the sheet 16. Within the mold 22 is defined a cavity 102 that is contacted by the sheet 16 during the forming process and that at least partially provides the desired shape to the item or part 74 to be formed therein. The cavity 102 can be at least partially surrounded by a peripheral ridge 104 and/or lip 51. Additionally, the mold 22 includes a recess 105 disposed generally opposite the cavity 102 that has a cross-sectional area or diameter that closely conforms to the shape of the back plate 23, such that the back plate 23 can be positioned within the recess 105 to properly locate the mold 22 on the back plate 23 and mold platen 24.

The mold 22 also includes a number of headspaces 107 that are in communication with a plurality of air channels 35 extending through the mold 22 into communication with the cavity 102. The headspaces 107 are disposed in alignment and communication with the openings 31, 32 and 36 in the mold plate 24 and the back plate 23, such that the air flows through these openings 31, 32 and 36 are directed by the headspaces 107 through the air channels 35.

To ensure that the air flow through the back plate 23 does not bypass the headspace 107 and air channels 35 aligned therewith, the back plate 23 includes a sealing member 34, preferably formed as a resilient rubber O-ring, thereon that is positioned around the periphery of the back plate 23 to engage and form an airtight seal between the back plate 23 and the mold 22 around the opening 32 in the back plate 23 and the associated headspace 107 in the mold 22.

Additionally, the mold 22 is releasably secured to the back plate 23 and the mold plate 24 in any suitable manner, such that the mold 22 can be removed and replaced by another mold 22 having a different configuration in order to form items 74 from the sheet 16 having a different shape.

The bottom platen 18 includes an air box 20 that is formed similarly to the mold platen 24, and includes a cavity 106 formed therein that communicates with the cavity 102 on the mold platen 24. The air box 20 also includes a number of apertures 31', 32' that extend through the air box 20 into communication with the cavity 106 to allow air to flow through the apertures 31', 32' and into or out of the cavity 106.

The cavity 106 is also formed to define a sealing lip 51' around the periphery of the cavity 106. The sealing lip 51' is engageable with the peripheral ridge 104 on the mold plate 24 in order to form an airtight seal between the air box 20 and the mold plate 24 when used to form an item from the sheet 16. This seal prevents any of the air flowing through the air box 20 or mold plate 24 from escaping from between the platens 12 and 18 in order to accurately form the sheet 16 into the desired item or part 74.

The central portion of the cavity 106 includes a recess 108 positioned in alignment with the central aperture 31' and including a sealing member 34' disposed along its periphery of the recess 108. Within the recess 108 is releasably positioned an air box mold 21 that is held within the recess 108 by any suitable securing means. The air box mold 21 is formed with a cross-sectional area or diameter that conforms closely to the cross-sectional area or diameter of the recess 108, such that the sealing member 34' forms an airtight seal between the air box mold 21 and the recess 108. Immediately adjacent the central aperture 31', the air box mold 21 defines a headspace 110 that enables air flow between the central aperture 31' and a number of air channels 35''' formed in the air box mold 21 through the headspace 110.

Opposite the headspace 110, the air box mold 21 includes a cavity 112. The cavity 112 is formed to have a shape corresponding to the shape for a central portion of the final item or part 74 produced from the sheet 16. The cavity 112 is surrounded by a peripheral ridge 51''' that sealingly engages the mold 22 around the air channels 35 in the mold 22 that are in fluid communication with the air flow through the back plate 23. Thus, this ridge or lip 51''' on the air box mold 21 effectively seals off the cavity 112 from the remainder of the mold 22, such that the portion of the sheet 16 positioned within the ridge 51''' can be formed separately from the remainder of the sheet 16 that is enclosed by the lip 51' surrounding the cavity 106 on the air box 20.

Referring now to FIGS. 4-8, the preferred method of operation of the device 100 is illustrated. Initially, after the material sheet 16 has been heated and consequently sufficiently softened by passing between the heater banks 14 and 15, the material sheet 16 is moved in between the platens 12 and 18 in any suitable manner, such as due the longitudinal motion of the clamps 17 engaging the opposite sides of the sheet 16. Once movement of the sheet 16 has stopped, a suitable operating mechanism, such as a motor, is operated to move the top platen 12 and bottom platen 18 towards each other. Alternatively, one of either the top platen 12 or the bottom platen 18 can be moved towards the remaining stationary top or bottom platen.

As best shown in FIG. 5, once the top platen 12 and bottom platen 18 are fully engaged with one another, i.e., the lip 51' on the bottom platen 18 has formed an airtight seal with the sheet 16 and the ridge 104 on the top platen 12, and the lip 51''' on the air box mold 21 has formed an airtight seal with the sheet 16 and the mold 22, a number of air flows are directed by a suitable device, such as a compressor, into and out of the various openings 31,32,36 and apertures 31',32' in the respective platens 12 and 18. Due to the seal formed by the engagement of the lip 51''' on the air box mold 21 and the mold 22 via the material sheet 16, the air flow directed into the cavity 112 on the air box mold 21 can be kept completely separate from that directed through the remainder of the device 100. In this manner, the portion of the sheet 16 disposed inside of the cavity 112 can be molded by the air flows therein in direction opposite to that of the remainder of the sheet 16 disposed within the device 100. For example, as shown in FIGS. 5-8, the formed part 74 includes a first portion 73 formed by air and vacuum pressure exerted to press the material sheet 16 against the cavity 102, and a second portion 72 formed as a raised portion within the first portion 73 by being pressed in the opposite direction by an opposite air pressure from that used to form the first portion 73.

In addition, the first portion 73 and the second portion 72 can have various details 75 formed therein that are not represented on the opposite side of the specific section. Furthermore, it is possible to use more than one air box mold 21 to form multiple seals 51, 51' and 51" in the device 100, and consequently to form multiple portions 72 in a formed part 74. Also, during formation of the formed part 74, the air flow to one of the cavity 102 or 112 can be omitted, such that only one portion 72 or 73 of the sheet is thermoformed by the air flow. Further, instead of having complementary vacuum and air flows acting on each section 72 and 73, the sections 72 and 73 can be formed simply from the application of either air or vacuum to that section 72 or 73.

As alternative embodiments to the lips 51 and 51' and 51", the seals formed by the air box 20 and the air box mold 21 can have other suitable structures to effect the air tight seal between the section of the platens 12 and 18, and can also be positioned on the mold plate 24 and/or mold 22.

In addition, in another embodiment for the forming device 100 that can be used with continuous material sheets 16 or with individual material sheets, the device 100 includes platens 12 and 18 formed with only the air box mold 21 and the mold 22. The air box mold 21 and the mold 22 are each formed with a peripheral lip 51, 51" that operates to engage and form an air tight seal with the sheet 16. Because the clamp 17 holds the sheet 16 in a stationary position when engaged by the air box mold 21 and the mold 22, the air box mold 21 and mold 22 can effectively form the air tight seals directly with the sheet 16 on opposite sides of the sheet 16 that result in the separate and oppositely formed portions 72 and 73 of the formed part 74 created in the manner described previously without the need for the air box 20. Further, with regard to the plate 12 or 18 including the air box mold 21, there can be multiple air box molds 21 positioned on the platen 12 or 18 to form multiple sections 72 on the formed part 74.

Various other alternatives are contemplated as being within the scope of the following claims particularly pointing out and distinctly claiming the subject matter regarded as the invention.

I claim:

1. A molding device comprising:
   a) a first molding member defining a first mold cavity therein;
   b) a second molding member defining a second mold cavity therein;
   c) at least one third molding member positioned between the first molding member and the second molding member within a recess defined in the second molding member, wherein the second molding member is sealingly engaged with the first molding member to form a first molding zone in which only one side of the material being molded is contacted, and wherein the third molding member is sealingly engaged with the first molding member to form a second molding zone that is sealed off from the first molding zone and in which only the opposite side of the material being molded is being contacted; and
   d) a sealing member disposed in the recess between the second molding member and the third molding member.

2. The molding device of claim 1, wherein the first molding zone has air pressure applied in a first direction.

3. The molding device of claim 2, wherein the second molding zone has an air pressure applied in a second direction opposite the first direction.

4. The molding device of claim 3 wherein both positive and negative air pressure are applied to the first molding zone.

5. The molding device of claim 1, wherein air pressure is only applied to the first molding zone.

6. The molding device of claim 1, wherein air pressure is only applied to the second molding zone.

7. The molding device of claim 1, wherein the third molding member is releasably engaged with the second molding member.

8. A thermoforming apparatus comprising:
   a) a material heating device; and
   b) a forming device including a first molding member defining a first mold cavity therein, a second molding member defining a second mold cavity therein, and at least one third molding member positioned between the first molding member and the second molding member within a recess defined in the second molding member and a sealing member disposed in the recess between the second molding member and the third molding member, wherein the second molding member is sealingly engaged with the first molding member to form a first molding zone, and wherein the third molding member is sealingly engaged with the first molding member to form a second molding zone that is sealed off from the first molding zone, and wherein the third molding member remains stationary on the second molding member during consecutive moldings of a plurality of molded products.

9. The thermoforming apparatus of claim 8, wherein the first molding member is affixed to a movable molding platen.

10. The thermoforming apparatus of claim 8, wherein the second molding member is affixed to a movable molding platen.

11. The thermoforming apparatus of claim 8, wherein the first molding member includes a mold plate and a back plate to which the mold plate is mounted.

12. The thermoforming apparatus of claim 8, wherein the first molding zone has air pressure applied in a first direction.

13. The molding device thermoforming apparatus of claim 12, wherein the second molding zone has an air pressure applied in a second direction opposite the first direction.

14. The thermoforming apparatus of claim 13 wherein both positive and negative air pressure are applied to the first molding zone and the second molding zone.

* * * * *